United States Patent Office 2,739,085
Patented Mar. 20, 1956

2,739,085

INSULATING COATINGS FOR MAGNETIC SHEETS

Byron V. McBride, Irwin, Pa., assignor to Westinghouse Electric Corporation, East Pittsburgh, Pa., a corporation of Pennsylvania No Drawing. Application March 13, 1953,
Serial No. 342,267

3 Claims. (Cl. 117—222)

This invention relates to the insulating coatings for magnetic sheets and to the process for producing them.

At the present time, a widely used insulating coating for magnetic sheets comprises magnesium oxide. Such coatings are applied in the form of aqueous suspensions composed of magnesium oxide and water as the sole ingredients. A thin layer of the suspension of magnesium oxide in water is applied to the surface of the magnetic sheets and then dried. However, the dry magnesium oxide coatings are extremely fragile, and any handling or touching of the coatings causes them to fall off in the form of powder and small scales. Since the magnetic sheet material must be assembled or formed into magnetic cores and then placed in annealing ovens to relieve the stresses imposed during the making of the cores, considerable amounts of the magnesium oxide coatings are lost. At the present time, great care is required in handling magnetic sheet material with the dried magnesium oxide coatings thereon, in order to prevent undesirable losses of the coatings. In spite of such great care, there is considerable loss of the magnesium oxide with resultant decrease in the insulation between the laminations when cores with the coatings have passed through the annealing ovens. A substantial number of cores fail to meet standard tests which require a predetermined amount of electrical insulation between the magnetic laminations forming the cores. In addition, the portions of the shops preparing magnetic cores from sheet magnetic material coated with magnesium oxide are extremely dusty due to the large quantity of the magnesium oxide coating that comes off. This constitutes a dust and health hazard in addition to making working conditions less desirable for the workmen handling the material.

The object of this invention is to provide a composition comprising magnesium oxide as the major ingredient and a small, but critical, amount of bentonite associated therewith to form highly adherent insulating coatings that are resistant to flaking and powdering on handling, when such compositions are applied to magnetic sheets and dried.

Another object of the invention is to provide a magnetic sheet with a thin adherent electrically insulating coating that is highly resistant to flaking and powdering on handling.

Other objects of the invention will, in part, be obvious and will, in part, appear hereinafter.

For a better understanding of the nature and objects of the invention, reference should be had to the following detailed description.

I have discovered that marked and unexpected improvements in coatings for magnetic materials may be produced by combining magnesium oxide with from 2% to 5% of its weight of bentonite, the mixture being suspended in water, applied to the magnetic material and dried. This coating composition is highly resistant to flaking and powdering, even when subjected to considerable handling and rubbing. Up to 50% by weight of the magnesium oxide may be replaced by one or more finely divided, inert, refractory solids selected from the group consisting of metal oxides, metal silicates and metal phosphates. Examples of such refractory solids are aluminum oxide, zirconium oxide, silica, iron oxides, calcium silicate, aluminum silicate, calcium phosphate, magnesium silicate and magnesium phosphate.

Bentonite is a natural colloidal crystalline inorganic hydrous aluminum silicate. A particularly suitable variety is that known as montmorillonite.

In producing the coatings of the invention, an aqueous suspension of the above components is employed. The suspension comprises essentially one part by weight of finely divided magnesium oxide, from 2% to 5% of bentonite based on the weight of the magnesium oxide and from 8 to 16 parts by weight of water. If more than 5% by weight of bentonite has been employed, the compositions become extremely thick and do not produce desirable insulating coatings on the magnetic sheet material. Less than 2% by weight of the bentonite does not produce a noticeable improvement in the coatings as compared to an all magnesium oxide coating. The amount of water is important in that small quantities of water result in a thick heavy gel which cannot be applied in any reasonable thickness to the surfaces of the magnetic material being treated. If more than 16 parts by weight of water are employed, then the composition becomes so thin that the applied coatings that adhere to the surface of the magnetic material are so deficient in magnesium oxide and bentonite that after drying there is no satisfactory electrical insulation present on the magnetic materials.

A layer of the resulting suspension is applied to the magnetic sheet material. The layer of the suspension may be from about 25% to 150% of the thickness of the magnetic sheet material. Upon drying the sheet material with the applied layer of suspension at about 100° C. the water is driven off, and a thin insulating layer adherent to the magnetic sheet is produced. The dry film is from about 5% to 20% of the thickness of the layer of suspension. During subsequent annealing at 900° C. to 1300° C., the films further shrink and their thickness is reduced to from about 50% to 30% of the previous dry film thickness.

In preparing the suspensions, the procedures set forth in the following examples have been found to be satisfactory:

Example 1

Three pounds of magnesium oxide of a fineness such that it will pass through a sieve having 200 meshes to the lineal inch, is stirred into 3 gallons of water at a temperature of 30° C. to 50° C. It is desirable to employ a power stirrer to produce a uniform suspension. Stirring for a period of 10 to 15 minutes with a propeller type stirrer will produce a uniform slurry. Into a separate container containing 1½ gallons of distilled water, heated to a temperature of from 35° C. to 45° C., there is sprinkled 35 grams of bentonite at such a rate that the bentonite sinks below the surface as fast as additional quantities drop upon the surface. The bentonite is usually received in the form of fragile pellets. After the addition of the bentonite has been completed, the latter mixture is permitted to stand for about 15 minutes, and then the mixture is stirred with a power stirrer for approximately 15 minutes. The bentonite suspension is then strained through a sieve having 100 meshes to the lineal inch and admixed with the magnesium oxide slurry previously prepared. It is desirable to keep the power stirrer operating throughout the period of addition of the bentonite suspension. The mixture will form a smooth, uniform-appearing suspension. In some instances, this mixture has been passed once through a high speed paint mill with the mill stones separated by a distance of about 0.001 inch.

The resulting suspensions may be tested to maintain their viscosity within desirable limits. One test that I have used with success is designated as the "Diametral Flow Test." In carrying out this test an open-ended metal cylinder having an inside diameter of 1 inch and the length of 1¼ inches, the interval volume being approximately 1 cubic inch, is placed with one end flush against a clean glass plate disposed in a horizontal plane, and the cylinder is filled with the composition. Care should be taken that there are no air bubbles trapped within the applied composition. The cylinder is then raised a distance of several inches above the glass plate and tilted to a 45° angle so that the suspension flows out of the cylinder. The flow of the suspension should be directed to produce a puddle. The cylinder may be gently shaken to dislodge as much compound as possible from the inside surfaces of the cylinder. A roughly circular puddle will be produced. The average diameter of this puddle is determined by measurements after five minutes standing, and the value so secured is the indication of the viscosity or consistency of the suspension. It is desirable that the puddle should have a diameter of not less than 1⅛ inches and not materially exceeding 3½ inches. Thus, a composition prepared from 3 pounds of magnesium oxide, 35 grams of bentonite and 4.9 gallons of water will produce a puddle of a diameter of between 2⅛ and 2⅜ inches. When 3 pounds of magnesium oxide, 34.8 grams of bentonite, and 3.75 gallons of water are combined, then the diameter of the puddle will be between 1¼ inches and 1½ inches.

The bentonite may be admixed with a small quantity of ethyl alcohol to form a thin slurry to facilitate addition to the water. The following example illustrates this feature.

*Example II*

Into a vessel there is placed 2¼ gallons of distilled water, and 3 pounds of magnesium oxide are suspended in the water, as described above in Example I. Thirty-four and one-half grams of finely powdered bentonite are admixed with 150 milliliters of ethyl alcohol (90%) in a 250 ml. beaker. A smooth alcohol and bentonite mixture is readily produced by stirring. The bentonite-alcohol mixture is then poured slowly into 2 gallons of water, using constant stirring to avoid the formation of lumps. The resulting bentonite-water suspension is then strained through a 100 mesh sieve and then poured slowly into the magnesium oxide-water suspension previously prepared. The use of a power stirrer during this last admixture is desirable. After the mixture has become smooth and uniform, it is passed through a paint mill having its stones separated by approximately 0.001 inch. The magnesium oxide-bentonite aqueous suspension is then ready for application to magnetic material. The "Diametral Flow Test" of this suspension is from 2 to 2⅛ inches.

I have produced suspensions of similar nature by substituting from 5% to 50% of the weight of the magnesium oxide with aluminum oxide, silica flour, and other finely divided, inert, refractory solids. It is preferable that these latter solids be of a fineness to pass through a sieve having 200 meshes per inch or finer.

*Example III*

Into a vessel containg 2¼ gallons of water there is sprinkled three pounds of previously prepared mixture of 325 mesh alumina and 325 mesh magnesium oxide, stirring being effected throughout by means of a propeller mixer. An aqueous suspension comprising 34.8 grams of bentonite and 2 gallons of water, prepared as in Example II, is then slowly added to the alumina-magnesium oxide suspension. After the mixture becomes smooth, it is passed through a paint mill. The diameter of the puddle on the "Diametral Flow Test" is 2¼ to 2½ inches.

It will be understood that a good part of the magnesium oxide, when added to the water, hydrates to magnesium hydroxide. The hydrated magnesium oxide after being applied to magnetic sheet surfaces will dehydrate to the oxide if heated to temperatures of from 200° C. to 300° C. However, it is preferred to dry the applied coatings containing magnesium hydroxide, as well as any unhydrated magnesium oxide, and bentonite along with water at a temperature of about 100° C. In this range of temperatures, free water in the coating is driven off without causing the magnetic material to oxidize or rust. Thereafter, when cores are prepared from the sheet magnetic material with the dry insulating coating thereon and annealed at an elevated temperature of the order of 900° C. and higher, the magnesium hydroxide will dehydrate to form the oxide. Also, some reaction may take place between magnesium oxide and any surface oxides of the magnetic sheet material. For instance, silicon iron sheets will have some oxidized surface material present, namely, silicon dioxide and iron oxide, which will react with the magnesium oxide to form magnesium silicates and the like.

The suspensions produced in accordance with the present invention may be electrophoretically deposited on the surfaces of the magnetic material. The following example is illustrative of this practice.

*Example IV*

A suspension was prepared, as set forth hereinbefore, employing 3 pounds of magnesium oxide, 35 grams of bentonite dissolved in 150 milliliters of ethyl alcohol and a total of 5 gallons of water. The resulting smooth suspension was then admixed slowly into 15 gallons of water, and the resulting 20 gallons of solution was placed in a cell having a stainless steel plate as an anode. Into the cell, there was passed a ¼ inch wide metal strip of a thicknes of 0.002 inch, the strip being made the cathode. The pH of the solution was 10.1. An electrical current at 110 volts direct current was applied to the strip and the anode, the two being separated to pass a current of 55 amperes per square foot of the strip in the bath. The strip was passed into the bath at a speed of 30 feet per minute, approximately 1½ feet of the strip being immersed in the bath. A coating of a thickness of about 0.001 inch was deposited on the strip, which on drying at 100° C. resulted in a coating of 0.0001 inch thick being produced. When the voltage was increased to 150 volts D. C. so that 72 amperes per square foot of the strip was applied, the electrodeposited coating had a thickness of about 0.004 inch, which dried to a film 0.0004 inch thickness. The coated strip was immediately passed into an oven at 100° C. and dried. The strip in this particular example comprised a 50% nickel–50% iron alloy.

Whether applied by electrophoretic means or by simple dipping, or by means of a doctor blade or by rubber spreading rolls, it is desirable that the thickness of the layer of applied suspension on the magnetic steel surfaces be of from 25% to 150% of thickness of the sheet. For extremely thin gauge magnetic sheet, namely from 0.004 inch to 0.0005 inch thick silicon iron alloys, nickel iron alloys, cobalt iron alloys, and the like, the applied layer of suspension is from 50% to 150% of the thickness of this sheet. For heavier magnetic steel of the order of 14 to 22 mils, the coatings may be 5 to 15 mils. The magnetic material with the applied coating of suitable thickness is passed into an oven where it is heated at a temperature of about 100° C. to drive off the water. The applied coatings become considerably thinner due to the relatively large amount of water driven off. The resulting dried coatings are unusually durable and highly adherent. The sheet magnetic material with the dried coatings thereon may be rubbed or coiled, or otherwise handled, without any appreciable powdering or flaking of the magnetic material. I have wound large coils of the dried magnetic material with the coating thereon and stacked it for long periods of time, and then unwound the coils and formed magnetic cores therefrom by punching and winding and the like. There was practically no loose powder produced in any of these operations. These magnesium oxide-bentonite coatings withstood all of this treatment extremely well and appeared intact. The edges of the magnetic strip were particularly well coated. On annealing, these coatings shrink still further.

*Example V*

Strips of 2 mil thick 50% nickel–50% iron magnetic material were coated with a 2 mil thick layer of the suspension of Example I. The strips were passed into an oven heated with radiant heating elements to drive off the water. The strip was heated to about 100° C. in the oven. The dried insulating film which was so produced was of a thickness of 0.0002 inch. The strip of magnetic material was then wound into round cores of about 1 inch in diameter with about 50 layers of the magnetic material. The wound core was then annealed to 950° C. in a hydrogen atmosphere. The insulating material shrank further to a final thickness of approximately 0.0001 inch.

Electrical tests were made of magnetic cores produced from this material and annealed at temperatures of from 900° C. to 1300° C., and in all these tests the cores showed high interlaminar resistance. When magnesium oxide alone was used as a coating material, a substantial number of cores was rejected because of inadequate coatings thereon and these inadequately coated cores had to be scrapped. With the compositions of this invention scrap losses due to inadequate insulating coatings has become negligible.

Since certain changes in practicing the above process and certain modifications in the resulting magnetic members may be made without departing from the scope thereof, it is intended that all matter contained in the above description be interpreted as illustrative.

I claim as my invention:

1. Magnetic sheet material having on its surface a thin, highly adherent, dried coating comprising essentially from 95% to 98% by weight of magnesium oxide and magnesium hydroxide, and from 5% to 2% by weight of bentonite.

2. In an annealed magnetic core comprising a plurality of superimposed sheets of magnetic material and a thin electrically insulating coating between the sheets, the improvement which comprises forming the coating from a composition comprising essentially from 95% to 98% by weight of magnesium oxide and from 5% to 2% by weight of bentonite.

3. Magnetic sheet material having on its surface a thin, highly adherent, dried coating comprising essentially from 98% to 47½% by weight of magnesium oxide and magnesium hydroxide, up to 49% by weight of a finely divided, inert refractory solid selected from the group consisting of metal oxides and metal silicates, and from 5% to 2% by weight of bentonite.

References Cited in the file of this patent

UNITED STATES PATENTS

| | | |
|---|---|---|
| 2,121,606 | McCulloch | June 21, 1938 |
| 2,426,445 | Frish | Aug. 26, 1947 |
| 2,515,788 | Morrill | July 18, 1950 |

FOREIGN PATENTS

| | | |
|---|---|---|
| 487,198 | Great Britain | of 1938 |